United States Patent
Okamoto et al.

(10) Patent No.: US 8,154,746 B2
(45) Date of Patent: Apr. 10, 2012

(54) INFORMATION COMMUNICATION SYSTEM, SENDING DEVICE, RECEIVING DEVICE, RECORDING MEDIUM STORING TRANSMISSION CONTROL PROGRAM, RECORDING MEDIUM STORING RECEPTION CONTROL PROGRAM, DATA SIGNAL EMBODIED IN CARRIER WAVE, SENDING METHOD, AND RECEIVING METHOD

(75) Inventors: Akira Okamoto, Saitama (JP); Yuriko Inakawa, Saitama (JP); Jun Wakamatsu, Saitama (JP); Eiji Nishi, Saitama (JP); Fumio Harada, Saitama (JP); Atsuhiro Itoh, Saitama (JP); Masaki Kurokawa, Saitama (JP); Noriyuki Tatsuma, Saitama (JP); Takanari Ishimura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1052 days.

(21) Appl. No.: 11/845,981

(22) Filed: Aug. 28, 2007

(65) Prior Publication Data

US 2008/0055638 A1 Mar. 6, 2008

(30) Foreign Application Priority Data

Aug. 29, 2006 (JP) ................................. 2006-232314

(51) Int. Cl.
*G06F 15/00* (2006.01)
*H04L 12/28* (2006.01)

(52) U.S. Cl. ...................................... 358/1.15; 370/401

(58) Field of Classification Search ................. 358/1.15, 358/1.13, 1.16, 1.14, 1.8, 442, 1.17, 1.9, 358/462, 1.18; 709/203, 206, 224, 229; 370/401, 370/338, 253, 463, 224, 310; 348/207.99, 348/222.1; 455/411, 431
See application file for complete search history.

(56) References Cited

U.S. PATENT DOCUMENTS 6,754,196 B1 * 6/2004 Daane et al. .................. 370/338

FOREIGN PATENT DOCUMENTS

JP 2002-247085 A 8/2002
JP 2005341310 A 12/2005

\* cited by examiner

Primary Examiner — Saeid Ebrahimi Dehkordy
(74) Attorney, Agent, or Firm — Sughrue Mion, PLLC

(57) ABSTRACT

An information communication system having a sending device that sends electronic information via a communication section, a receiving device that receives the electronic information sent from the sending device via the communication section, the sending device which includes a ratio information maintaining section that maintains ratio information regarding an amount of electronic information assigned to each of plural communication sections at the time of sending the electronic information, a dividing section that divides the electronic information corresponding to the plural communication sections on the basis of the maintained ratio information, and a sending section that sends the divided electronic information to the receiving section, the receiving device comprising, a receiving section that receives the electronic information sent from the sending section via the plurality communication sections, and a restoring section that combines and restores the received electronic information to a state prior to being divided by the dividing section.

5 Claims, 14 Drawing Sheets

● GROUP OF SEPARATED DIVIDED DATA FOR WIRED LAN INTERFACE 21

| SEPARATION HEADER #1 | SEPARATED DIVIDED DATA #1 (3000 BYTE) | SEPARATION HEADER #3 | SEPARATED DIVIDED DATA #3 (3000 BYTE) | ... |

● GROUP OF SEPARATED DIVIDED DATA FOR WIRELESS LAN INTERFACE 22

| SEPARATION HEADER #2 | SEPARATED DIVIDED DATA #2 (1500 BYTE) | SEPARATION HEADER #4 | SEPARATED DIVIDED DATA #4 (1500 BYTE) | ... |

FIG.3

● CONFIGURATION EXAMPLE OF SEPARATION HEADER

| SENDER ID | JOB ID | SEPARATION NUMBER N | SEPARATED DIVIDED DATA LENGTH LEN (N) | ... |

FIG.4

● RATIO OF STANDARD SPEED OF INTERFACE

| COMMUNICATION INTERFACE STANDARD | WIRED LAN | WIRELESS LAN |
|---|---|---|
| COMMUNICATION SPEED | 100 Mbps | 54 Mbps |
| DIVIDING RATIO | 100 : 54 ≒ 2 : 1 ||

FIG.14A

● RATIO OF RESPONSE TIME FROM RECEIVING DEVICE

| COMMUNICATION INTERFACE STANDARD | WIRED LAN | WIRELESS LAN |
|---|---|---|
| RESPONSE TIME | 0.3 SEC | 0.7 SEC |
| DIVIDING RATIO | (1/0.3) : (1/0.7) ≒ 2 : 1 ||

FIG.14B

INFORMATION COMMUNICATION SYSTEM, SENDING DEVICE, RECEIVING DEVICE, RECORDING MEDIUM STORING TRANSMISSION CONTROL PROGRAM, RECORDING MEDIUM STORING RECEPTION CONTROL PROGRAM, DATA SIGNAL EMBODIED IN CARRIER WAVE, SENDING METHOD, AND RECEIVING METHOD

CROSS-REFERENCE TO RELATED APPLICATION

This application is based on and claims priority under 35 USC 119 from Japanese Patent Application No. 2006-232314 filed on Aug. 29, 2006.

BACKGROUND

1. Technical Field

The present invention relates to an information communication system, a sending device, a receiving device, a recording medium storing transmission control program, a recording medium storing reception control program, a data signal embodied in a carrier wave, a sending method, and a receiving method.

2. Related Art

In private companies, government or public offices, schools and so on, communication environments have been established so that plural users can share and utilize printing machines, document managing devices or other devices which are connected through LAN (Local Area Network) or other communication means.

In such communication environments, data communication is performed between devices, each of which is connected to communication means. However, if traffic increases or trouble occurs on the communication lines, this may cause the deterioration in the use efficiency of the communication means.

SUMMARY

An aspect of the present invention provides an information communication system having: a sending device that sends electronic information via a communication section; a receiving device that receives the electronic information sent from the sending device via the communication section, the sending device which includes: a ratio information maintaining section that maintains ratio information regarding an amount of electronic information assigned to each of plural communication sections at the time of sending the electronic information; a dividing section that divides the electronic information corresponding to the plural communication sections on the basis of the ratio information maintained by the ratio information maintaining section; and a sending section that sends the electronic information divided by the dividing section to the receiving section, the receiving device comprising: a receiving section that receives the electronic information sent from the sending section via the plural communication sections; and a restoring section that combines and restores the electronic information received by the receiving section to a state prior to being divided by the dividing section.

BRIEF DESCRIPTION OF THE DRAWINGS

An exemplary embodiment of the present invention will be described in detail based on the following figures, wherein:

FIG. 3 is a diagram showing a configuration of sent data;

FIG. 4 is a diagram showing an example of a configuration of a division header included in the sent data;

FIGS. 14A and 14B are diagrams showing an example of process at the time of calculating the dividing ratio based on the communication speed.

DETAILED DESCRIPTION

Hereinafter, the detailed description of the examples of an information communication system, a sending device, a receiving device, a recording medium storing transmission control program, a recording medium storing reception control program, a data signal embodied in a carrier wave, a sending method, and a receiving method pertaining to the present invention will be made with reference to the attached drawings. It should be noted that, in the following examples, descriptions will be made based on a case, as typical exemplary embodiments of the present invention, where, in communicating through the wired LAN and through the wireless LAN, each data (electronic information) is divided and sent through both of the communication sections.

FIRST EXAMPLE

Figure 1:
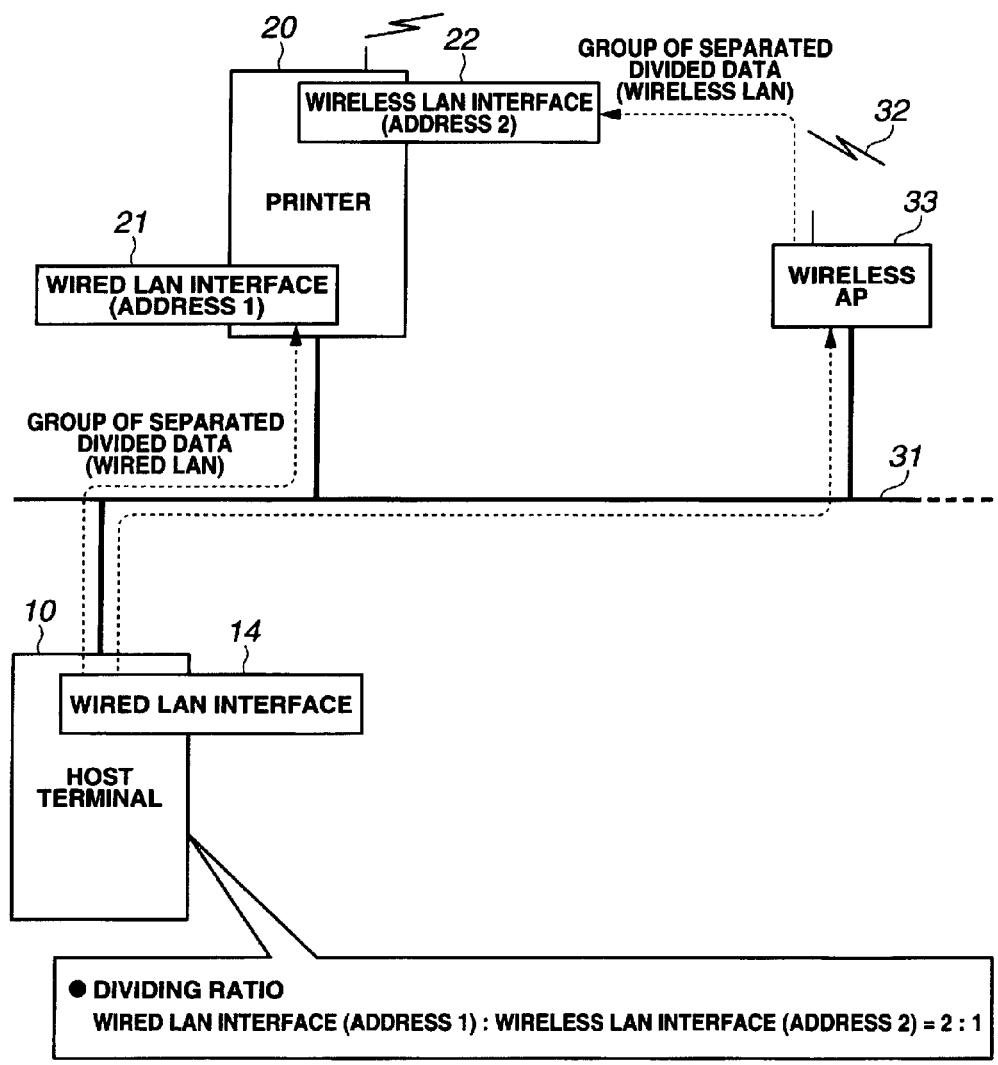
FIG. 1 is a diagram showing an example of entire configuration of an information communication system pertaining to the present invention.

FIG. 1 provides an example of entire configuration of the information communication system pertaining to the present invention. It should be noted that, in this first example, a description will be made as an example based on a case where the present invention is applied to the information communication system having a host terminal 10 and a printer 20.

In this information communication system, the host terminal 10 that is a sending device for sending data, and the printer 20 that is a receiving device for receiving the data are connected to each other via plural communication sections (wired LAN 31, wireless LAN 32). It should be noted that the wired LAN 31 and the wireless LAN 32 are relayed through a wireless AP (Access Point) 33.

The host terminal 10 is a general-purpose computer and so on for a user. The host terminal 10 includes a wired LAN interface 14. Through this wired LAN interface 14, printing data is sent to the printer 20 via the wired LAN 31 and the wireless LAN 32. When the user gives a printing instruction from this host terminal 10, printing data is generated based on this instruction, and is sent to the printer 20.

The printer 20 receives the printing data sent from the host terminal 10 and performs printing out based on the received data. The printer 20 includes a wired LAN interface 21 and a wireless LAN interface 22, and receives the printing data sent from the host terminal 10 through the wired LAN 31 and the wireless LAN 32. An address 1 and an address 2 are assigned as a destination address to the wired LAN interface 21, and the wireless LAN interface 22, respectively. The host terminal 10 designates each of the addresses and sends the printing data. More specifically, when the host terminal 10 sends the printing data to the address 1, the printing data passes through the wired LAN 31. And, the printer 20 receives this data using the wired LAN interface 21. When the host terminal 10 sends the printing data to the address 2, the printing data passes through the wireless LAN 32. And, the printer 20 receives this data using the wireless LAN interface 22.

Here, it is assumed, for example, that the printing instruction is given from the user using the host terminal 10. In this case, while generating the printing data relating to the instruction, the host terminal 10 divides the generated printing data based on a prescribed dividing ratio (ratio information). The dividing ratio shows the ratio of the amount of transmission data that is allocated to each of the wired LAN 31 and the wireless LAN 32 when the printing data is sent. In this case, the dividing ratio of the data to be sent to the wired LAN interface 21 to that to the wireless LAN interface 22 is set to 2 to 1. Thus, for example, when the printing data with 15000 byte is sent, the data is divided to data with 10000 byte and data with 5000 byte, and then, the data with 10000 byte is sent through the wired LAN 31, and the data with 5000 byte is sent through the wireless LAN 32. It should be noted that if the amount of printing data is less than a prescribed size, the division is not performed.

After dividing the printing data through the procedure described above, the host terminal 10 further separates the divided data into the data with appropriate size for sending, and attaches the separation header to each of the separated divided data (See FIG. 3 described later). A group of separated divided data for the wired LAN interface 21 and that for the wireless LAN interface 22, each of which the separation header is attached to, are sent to the address 1 and the address 2, respectively.

The printer 20 receives those data through the wired LAN interface 21 and the wireless LAN interface 22. The printer 20 combines the group of divided data received through the wired LAN interface 21 with the group of divided data received through the wireless LAN interface 22 based on the separation header (see FIG. 4 described later) attached to each of the separated divided data, and restores those printing data to the pre-divided state. Then, the printing is performed based on the printing data that is restored to the pre-divided state.

Next, with reference to FIG. 2, a part of the configuration of functions of the host terminal 10 as shown in FIG. 1 will be described below. The host terminal 10 includes, as its functions, an application 11, a printer driver 12, a port monitor 13, and a wired LAN interface 14.

The application 11 is common software having a printing function. The printer driver 12 is software that converts the printing data generated by the application 11 into printing data in a form that can be interpreted by the printer 20 that is a printing destination. The port monitor 13 is software that sends the printing data converted by the printer driver 12 to the communication interface (wired LAN interface 21, wireless LAN interface 22) in the printer 20 using the wired LAN interface 14. The wired LAN interface 14 is a communication interface that controls the communication through the wired LAN 31.

The port monitor 13 includes, as its functions, a division necessity judging section 41, a division information maintaining section 42, a data dividing section 43, a data sending section 44, and an address information maintaining section 45.

The division necessity judging section 41 judges whether dividing the printing data is necessary or not. This judgment whether divide or not is made based on a minimum division applicable size maintained in the division information maintaining section 42. When the printing data is less than the size indicated in the minimum division applicable size, it is judged that dividing the printing data is not necessary.

The division information maintaining section 42 maintains information regarding the division. More specifically, the division information maintaining section 42 maintains information including the dividing ratio, the minimum division applicable size, and the separation unit. It should be noted that, in the present example, it is assumed that: for the dividing ratio, the ratio of the address 1 (wired LAN interface 21) to the address 2 (wireless LAN interface 22) is set to 2:1; the separation unit is set to 1500 byte; and the minimum division applicable size is set to 5000 byte.

The data dividing section 43 divides the printing data based on the dividing ratio maintained in the division information maintaining section 42. Additionally, as shown in FIG. 3, the data dividing section 43 separates the divided printing data into the data having the appropriate size for sending, and attaches the separation header to each of the separated divided data. In this case, since the separation unit is 1500 byte, the data to be sent to the wired LAN interface 21, which has the separation ratio of "2", is separated into the unit of 3000 byte (1500 bite×2) while the data to be sent to the wireless LAN interface 22, which has the separation ratio of "1", is separated into the unit of 1500 byte (1500 bite×1).

Additionally, as shown in FIG. 4, the separation header includes a sender ID for identifying a sender, a job ID for identifying a job, a separation number indicating the original order of the divided data, and a separated divided data length indicating the length of the separated divided data.

The data sending section 44 sends the printing data using the wired LAN interface 14. When sending the divided printing data, the data sending section 44 sends each of the groups of separated divided data having the separation header to each of the address 1 (wired LAN interface 21) and the address 2 (wireless LAN interface 22).

The address information maintaining section 45 maintains the address of the printer 20 to which the printing data is sent. The address information maintaining section 45 of the present example maintains address information of the address 1 assigned to the wired LAN interface 21 in the printer 20 and address information of the address 2 assigned to the wireless LAN interface 22 in the printer 20. These are the description of each process function of the host terminal 10.

Figure 5:
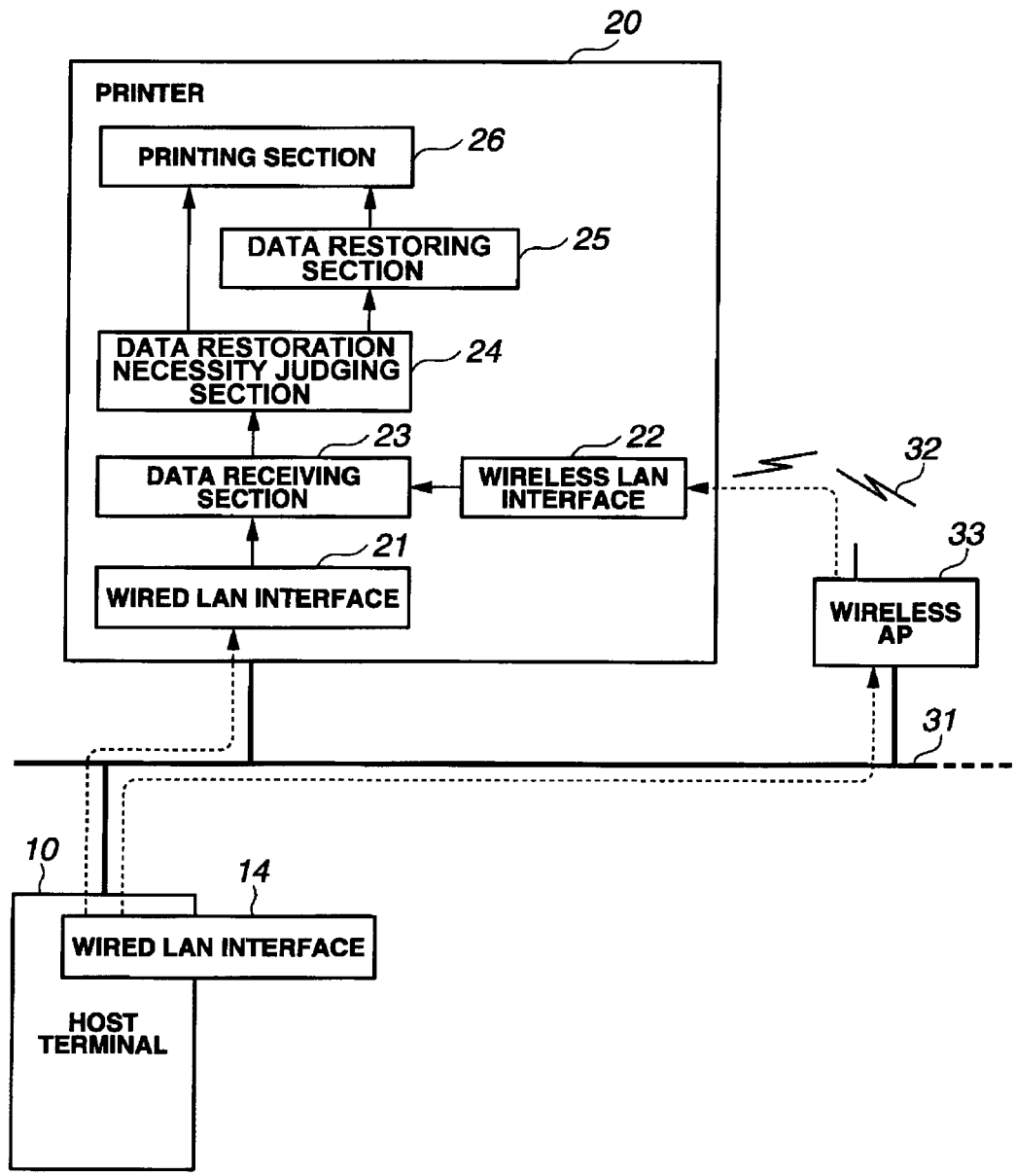
FIG. 5 is a diagram showing a part of a configuration of functions of a printer 20 shown in FIG. 1.

Next, with reference to FIG. 5, a part of the configuration of functions of the printer 20 as shown in FIG. 1 will be described. The printer 20 includes, as its functions, the wired LAN interface 21, the wireless LAN interface 22, a data receiving section 23, a restoration necessity judging section 24, a data restoring section 25 and printing section 26.

The wired LAN interface 21 controls the communication through the wired LAN 31. The wireless LAN interface 22 controls the communication through the wireless LAN 32.

The data receiving 23 receives the printing data using the wired LAN interface 21 and/or the wireless LAN interface 22. When receiving the divided printing data, the data receiving section 23 receives the groups of the separated divided data, each of which is sent to each of the address 1 (wired LAN interface 21) and the address 2 (wireless LAN interface 22) by using each of the communication interfaces.

The restoration necessity judging section 24 judges whether analyzing and restoring the received printing data is necessary or not. The judging whether this restoration is necessary or not is made on the basis whether the received printing data includes the separation header or not. When the received printing data includes the separation header, the printing data is divided. Thus, it is judged that restoring is necessary.

The data restoring section 25 combines and restores the divided printing data to the pre-divided state. The data restoring section 25 performs the restoration based on the separation header attached to each of the separated divided data.

The printing section 26 performs a printing out on the sheet of paper or other recording medium based on the printing data. Even when the printing data is sent to the printer 20 in the divided state, the data restoring section 25 brings back the data to the pre-divided state. Thus, this data is printed similar to the printing data that is sent to the printer 20 without being divided. These are the description of each of the process functions of the printer 20.

Figure 6:
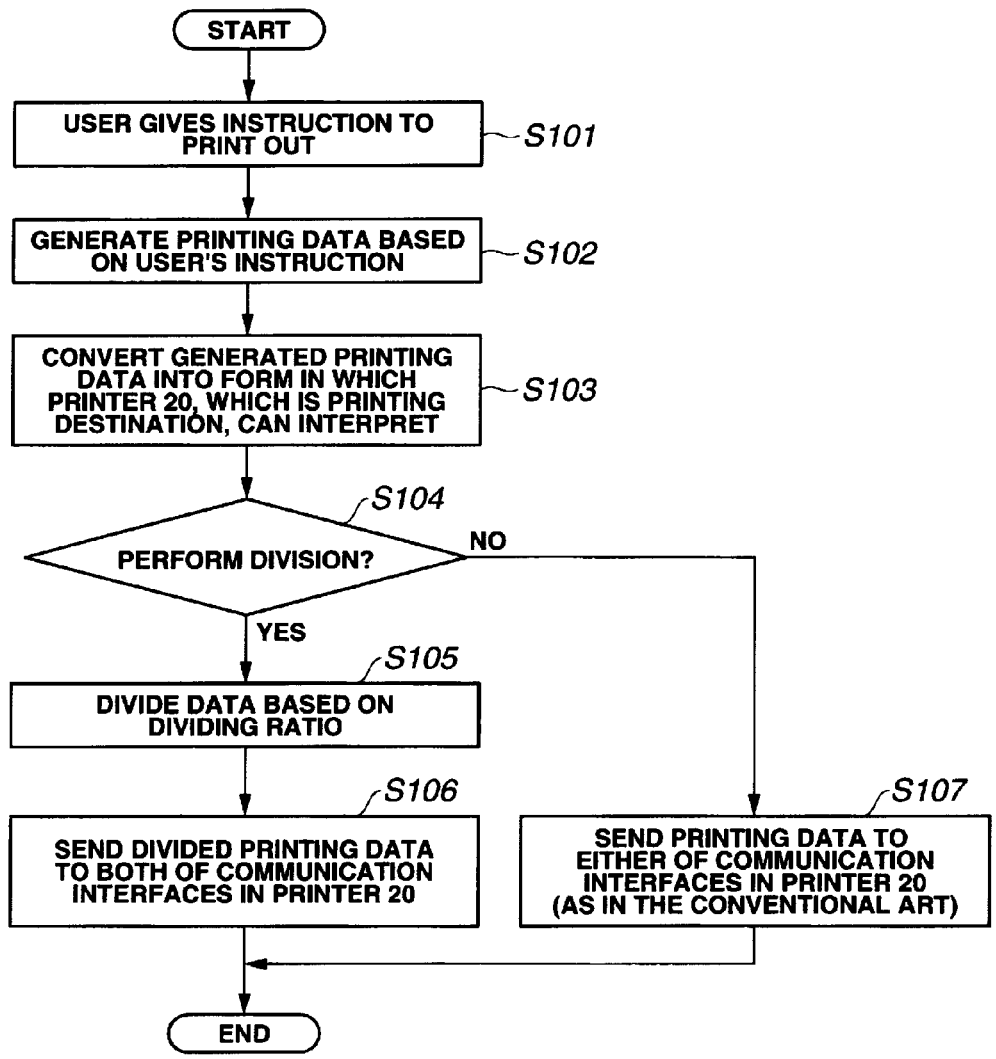
FIG. 6 is a flowchart showing operation at the time of instructing printing from the host terminal 10 showing in FIG. 1.
Figure 7:
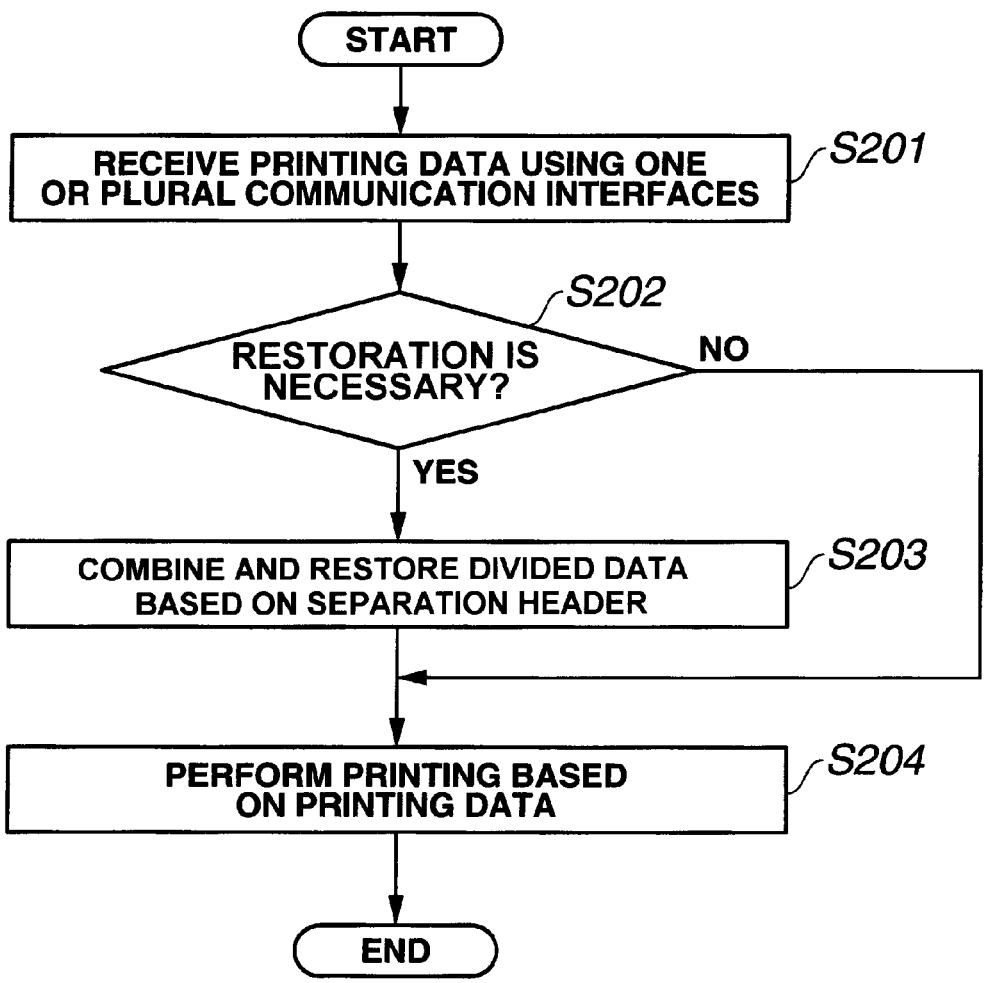
FIG. 7 is a flowchart showing operation at the time of printing in the printer 20 shown in FIG. 1.

With reference to FIGS. 6 and 7, a printing operation in the information communication system as shown in FIG. 1 will be described below. It should be noted that the operation in the host terminal 10 and that in the printer 20 are shown as flowchart in FIG. 6 and FIG. 7, respectively.

Firstly, with reference to FIG. 6, a description will be made of a process when an instruction to print out is given from the host terminal 10.

When the user gives an instruction to print out using the host terminal 10 (step S101), the printing data is generated by the application 11, and then is delivered to the printer driver 12 (step S102). The printer driver 12 converts the printing data generated by the application 11 in a form that can be interpreted by the printer 20, which is a printing destination, and delivers it to the port monitor 13 (step S103).

Upon receiving the printing data, the port monitor 13 judges whether the received printing data is to be divided. More specifically, in the division necessity judging section 41, it is judged whether the size of the received printing data is less than the size of the minimum division applicable size.

As a result, when it is judged that the printing data is not to be divided because the size of the printing data is less than the size of the minimum division applicable size (no in step S104), the printing data is sent, by the data sending section 44, to any of the communication interfaces in the printer 20 (step S107). When it is judged that the printing data is to be divided because the size of the printing data is the size of the minimum division applicable size or over (yes in step S104), the printing data is divided, by the data dividing section 43, based on the dividing ratio maintained in the division information maintaining section 42 (step S105). In other words, the printing data is divided into the data to be sent to the wired LAN interface 21 and the data to be sent to the wireless LAN interface 22. Then, each of the divided data is separated into the data appropriate for sending, and the separation header is attached to each of the separated divided data. Consequently, the printing data is divided into the group of the separated divided data to be sent to the wired LAN interface 21 and the group of the separated divided data to be sent to the wireless LAN interface 22.

In the data sending section 44, the groups of the separated divided data are respectively sent to the address 1 (wired LAN interface 21) and the address 2 (wireless LAN interface 22) (step S106). Then, the process ends.

Next, with reference to FIG. 7, a printing process in the printer 20 will be described.

When the printing data is sent to the printer 20, the data receiving section 23 in the printer 20 receives the data through the wired LAN interface 21 and/or the wireless LAN interface (step S201). After completing the reception of the printing data, the printer 20 firstly judges whether the received printing data requires the restoration or not. In other words, the restoration necessity judging section 24 judges whether the received printing data includes the separation header or not.

Then, when it is judged that the separation header is not included and the restoration is not necessary (no in step S202), this printing data is sent directly to the printing section 26, and printing is performed based on this printing data (step S204). On the other hand, when it is judged that the separation header is included and the restoration is necessary (yes in step S202), the printing data is restored to the pre-divided state in the data restoring section 25 (step S203). In other words, the data received through both of the wired LAN interface 21 and the wireless LAN interface 22 are combined based on the separation headers in the printing data received through both of the communication interfaces to restore the printing data.

After the printing data is restored to the pre-divided state through the restoring process by this data restoring section 25, the restored data is sent to the printing section 24, and the printing section 26 performs the printing out based on the printing data (step S204). Then, the process ends.

It should be noted that, in the above-described example, the description has been made by taking the case, for example, in which the minimum division applicable size is set; it is judged whether dividing the printing data is to be performed; and, the dividing is not performed when the size is less than the minimum division applicable size. However, it is understood that this judgment is not always necessary to be performed, and the present invention may be configured to divide all the sending data.

SECOND EXAMPLE

Figure 8:
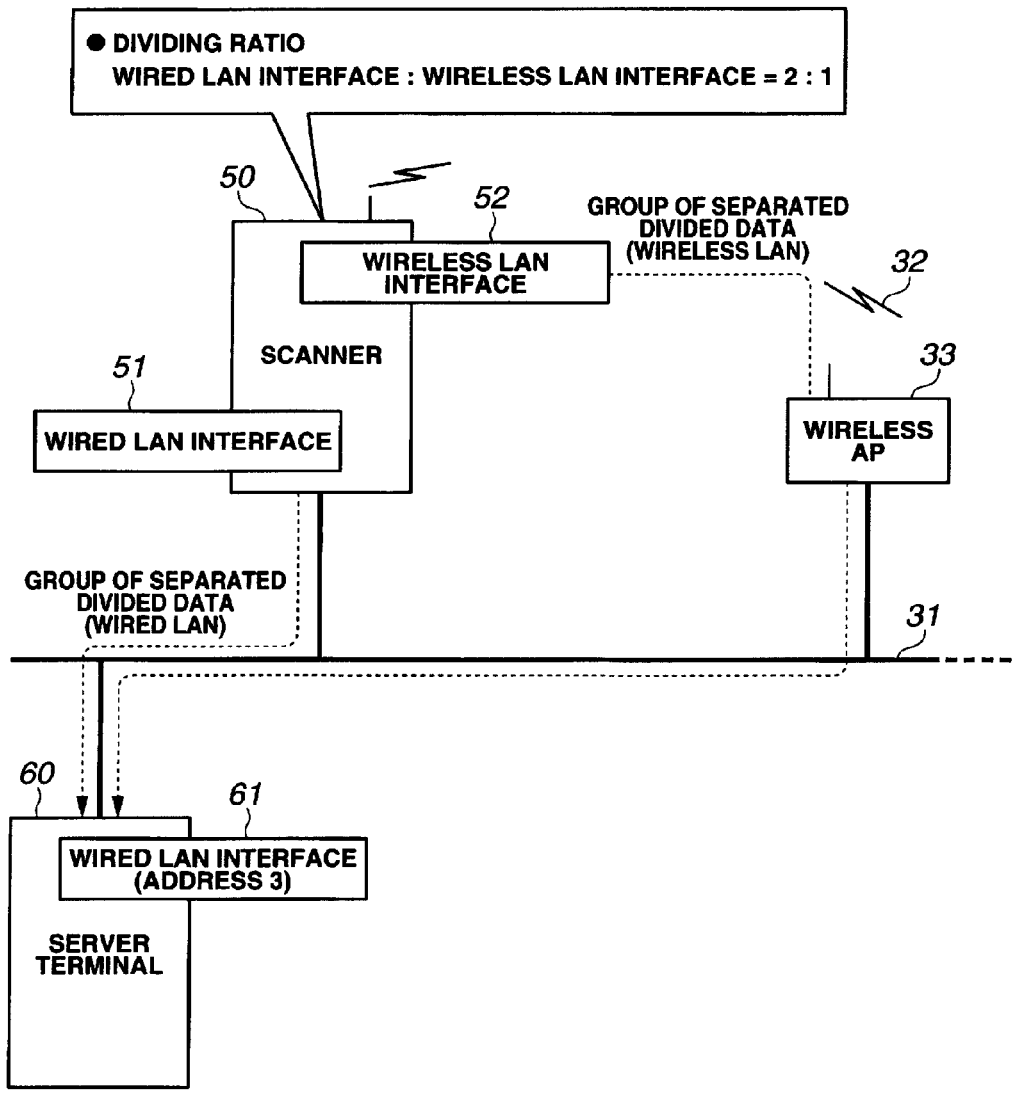
FIG. 8 is a diagram showing an example of entire configuration of an information communication system pertaining to a second example.

Next, a Second Example will be described. FIG. 8 provides an example of entire configuration of the information communication system pertaining to the Second Example. It should be noted that, in the Second Example, a description will be made using a case, for example, where the present invention is applied to the information communication system having a scanner 50 and a server terminal 60. In other words, in the Second Example, a sending device that sends data is the scanner 50, and a receiving device that receives the data is the server terminal 60. Additionally, while, in the First Example described above, plural communication interfaces are provided to the printer 20 that receives the data, in the Second Example, the scanner 50 that is the sending device has the plural communication interfaces.

Here, in the information communication system pertaining to the Second Embodiment, the scanner 50 and the server terminal 60 are connected to each other via plural communication sections (wired LAN 31, wireless LAN 32). It should be noted that the wired LAN 31 and the wireless LAN 32 are relayed through a wireless AP (Access Point) 33.

The scanner 50 reads image data by scanning original document placed on the platen glass or fed to the platen glass using the automatic document feeder. This read image data is sent as read data to the server terminal 60 to be stored. The scanner 50 includes a wired LAN interface 51 and a wireless LAN interface 52, and the read data is sent to the server terminal 60 via the wired LAN 31 and the wireless LAN 32 by using the wired LAN interface 51 and the wireless LAN interface 52.

The server terminal 60 has a memory, and is a computer and the like that functions as a repository. The server terminal 60 has a wired LAN interface 61, and receives, by using the wired LAN interface 61, the read data sent via the wired LAN interface 31 and the wireless LAN interface 32 from the scanner 50. An address 3 is assigned to the wired LAN interface 61, and the scanner 50 designates this address to send the read data via the wired LAN 31 and the wireless LAN 32. In other words, when the read data is sent to the address 3 using the wired LAN interface 51 in the scanner 50, the read data is sent via the wired LAN 31, and the server terminal 60 receives the data using the wired LAN interface 61. When the read data is sent to the address 3 using the wireless LAN interface 52 in the scanner 50, the read data is sent via the wireless LAN 32, the server terminal 60 receives the data using the wired LAN interface 61.

Here, for example, when the user gives an instruction to read the original document using the scanner 50, the scanner 50 reads the image data by scanning the original document, generates read data based on this image data, and divides the generated read data based on the prescribed dividing ratio. The division of the read data is carried out under the process similar to the division of the printing data as described in the above First Example. In this case, the ratio of data to be sent by using the wired LAN interface 51 to data to be sent by using the wireless LAN interface 52 is set to 2:1. Thus, for example, when the read data with 15000 byte is sent, the data is divided into the data with 10000 byte and the data with 5000 byte. Then, the data with the 10000 byte and the data with the 5000 byte are sent through the wired LAN 31 and the wireless LAN 32, respectively. It should be noted that the division of the read data is not carried out when the size of the read data is less than the prescribed size.

After dividing the read data through the above-described procedures, the scanner 50 separates the divided data into the data appropriate for sending, and attaches the separation header to each of the separated divided data. And, each of the groups of the separated divided data having the separation header is sent from the wired LAN interface 51 and the wireless LAN interface 52 to the address 3.

The sent data is received by the server terminal 60 through the wired LAN interface 61. The server terminal 60 combines the group of the separated divided data sent through the wired LAN 31 with the group of the separated divided data sent through the wireless LAN 32 on the basis of the separation header (see FIG. 4 described above) attached to each of the separated divided data to restore the read data to the pre-divided state. Then, the read data restored to the pre-divided state is stored in the memory to be saved.

Figure 9:
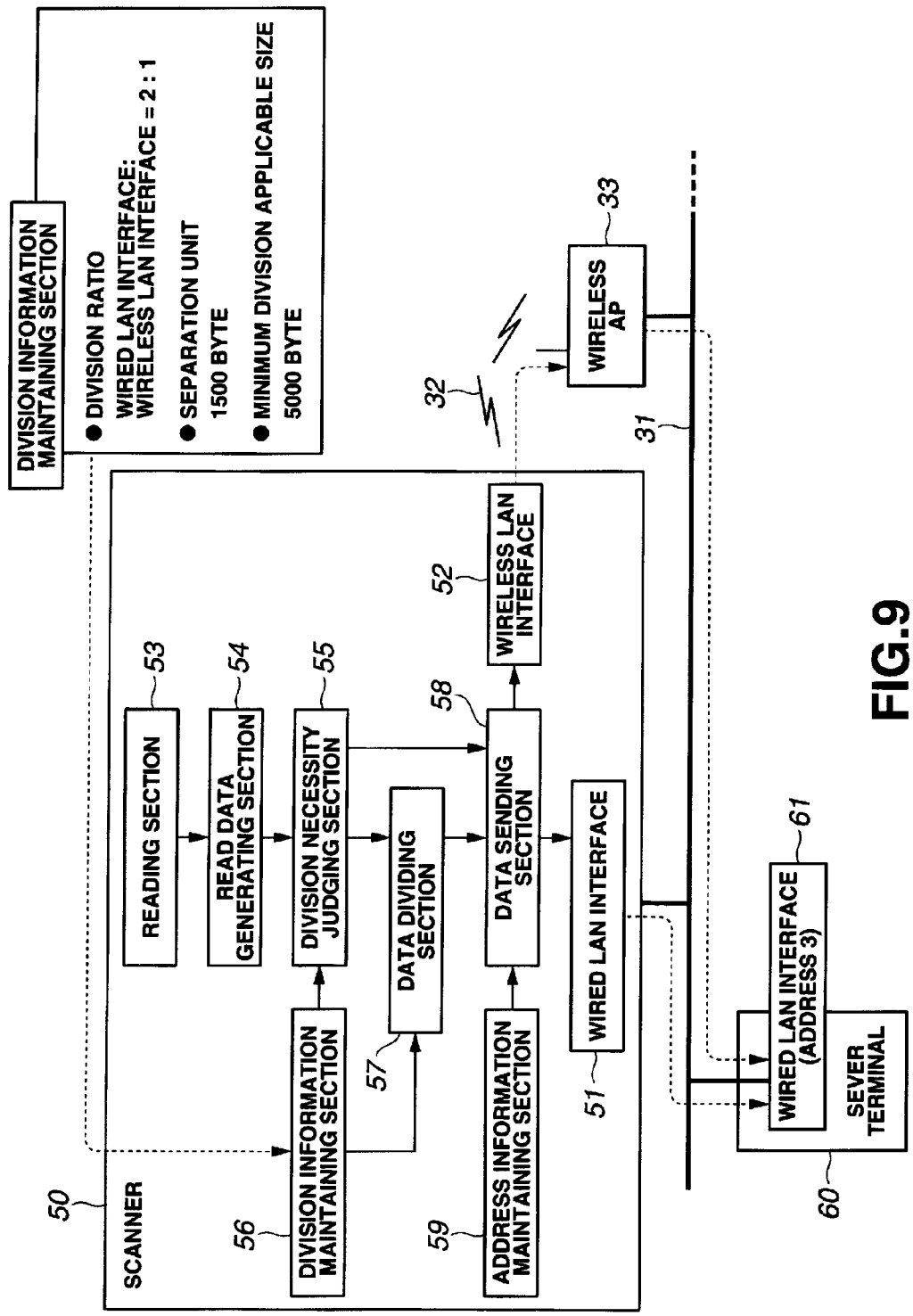
FIG. 9 is a diagram showing a part of a configuration of functions of a scanner 50 shown in FIG. 8.

Next, with reference to FIG. 9, a part of the configuration of functions of the scanner as shown in FIG. 8 will be described. The scanner includes, as its functions, the wired LAN interface 51, the wireless LAN interface 52, a reading section 53, a read data generating section 54, a division necessity judging section 55, a division information maintaining section 56, a data dividing section 57, a data sending section 58 and an address information maintaining section 59.

The wired LAN interface 51 controls the communication through the wired LAN 31, and the wireless LAN interface 52 controls the communication through the wireless LAN 32.

The reading section 53 reads the image data from the original document. The read data generating section 54 generates the read data by performing image processing, such as shading correction or color complementation, to the image data read by the reading section 53.

Figure 2:
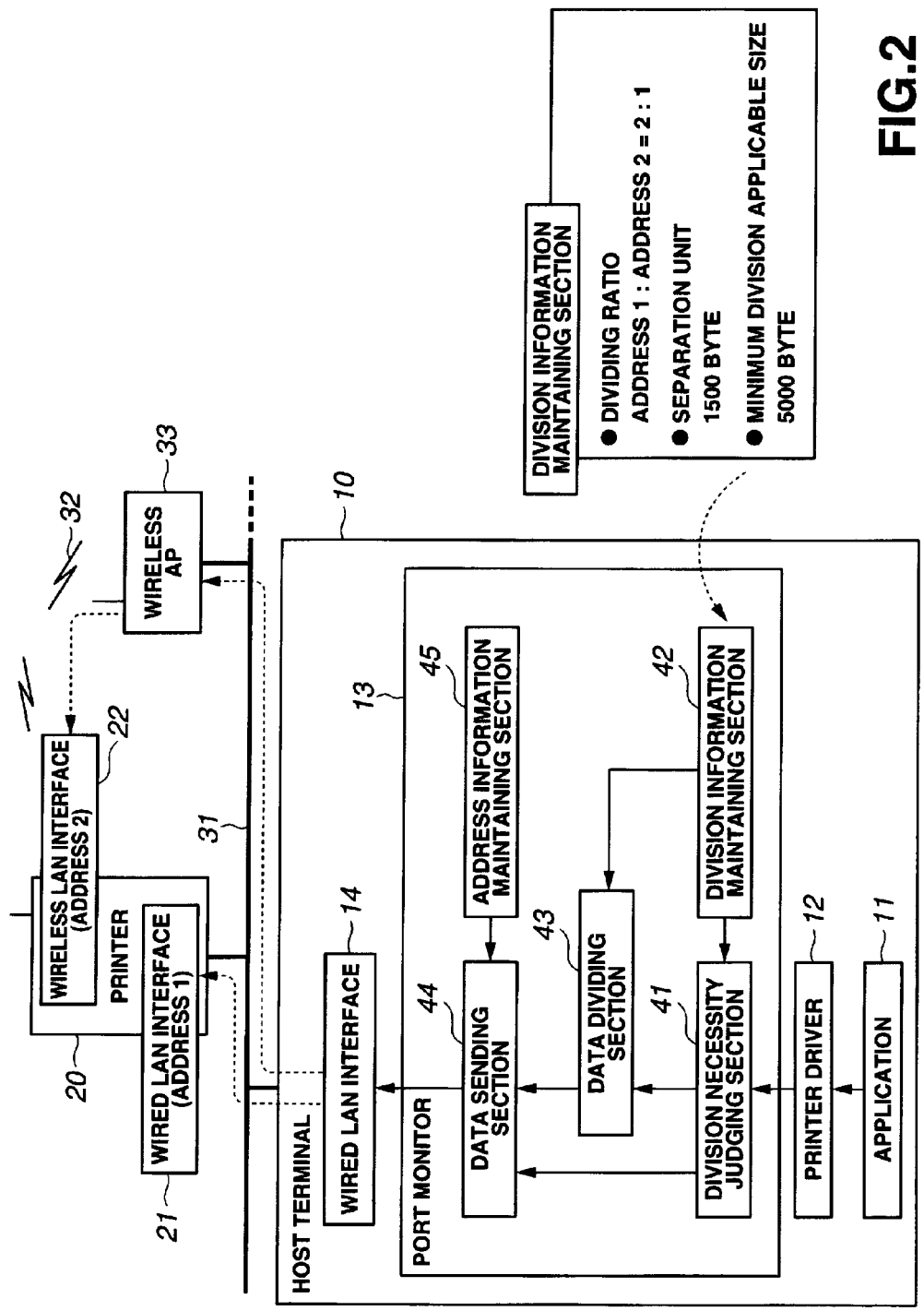
FIG. 2 is a diagram showing a part of a configuration of functions of a host terminal 10 shown in FIG. 1.

The division necessity judging section 55, the division information maintaining section 56, the data dividing section 57, the data sending section 58, and the address information maintaining section 59 correspond to the division necessity judging section 41, the division information maintaining section 42, the data dividing section 43, the data sending section 44, and the address information maintaining section 45 as described in FIG. 2 in the First Example, respectively, and each of the sections above has the substantially similar function. Thus, the description is omitted. It should be noted that the address information regarding the address 3 which is assigned to the wired LAN interface 61 in the server terminal 60 is maintained in the address information maintaining section 59. These are the descriptions of each of the process functions configuring the scanner 50.

Figure 10:
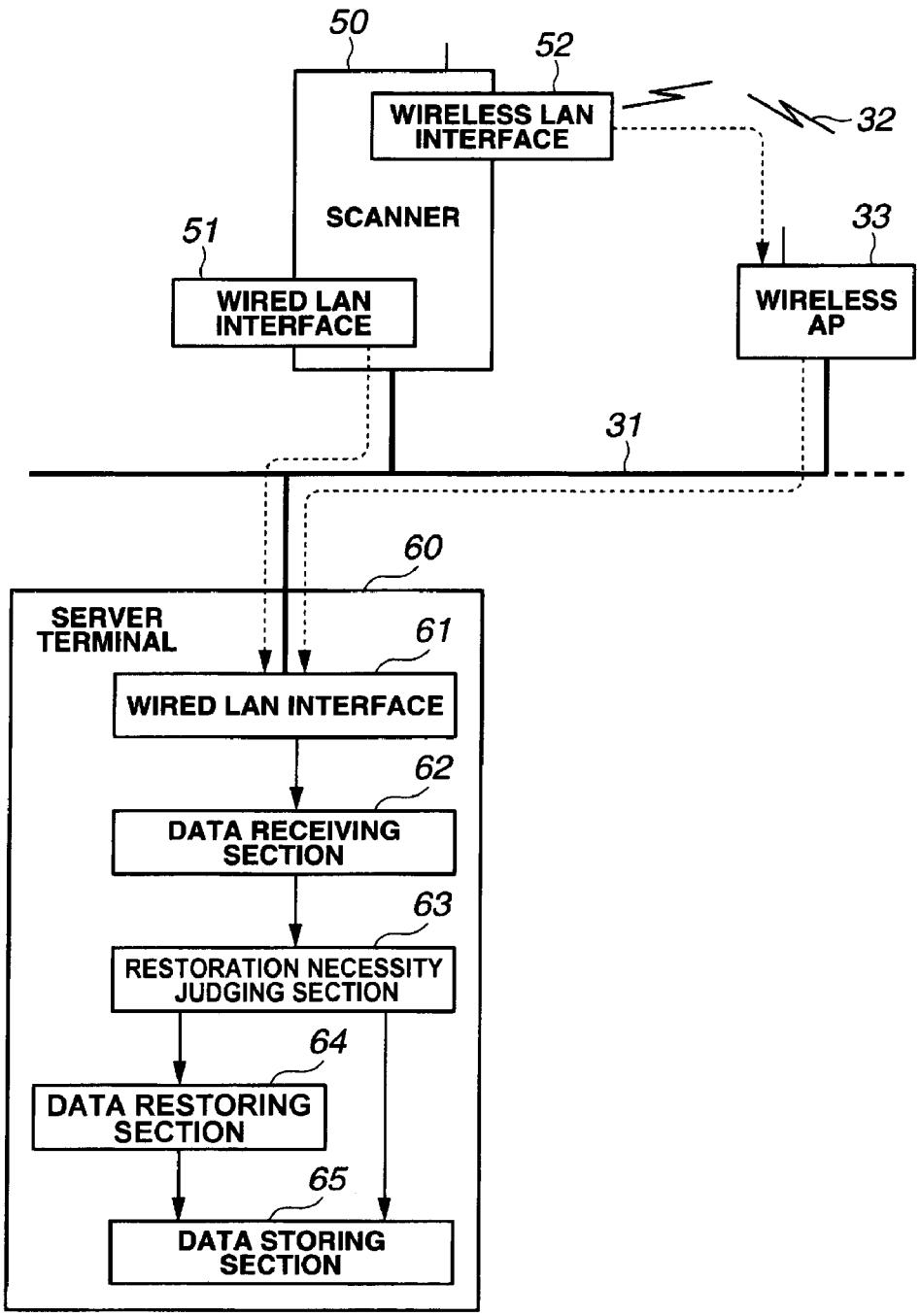
FIG. 10 is a diagram showing a part of a configuration of functions of a server terminal 60 shown in FIG. 8.

Next, with reference to FIG. 10, a part of the configuration of functions of the server terminal 60 as shown in FIG. 8 will be described. The server terminal 60 includes, as its functions, a wired LAN interface 61, a data receiving section 62, a restoration necessity judging section 63, a data restoring section 64, and a data storing section 65. It should be noted that each of the wired LAN interface 61, the data receiving section 62, the restoration necessity judging section 63, and the data restoring section 64 corresponds to each of the wired LAN interface 21, the data receiving section 23, the restoration necessity judging 24, and the data restoring section 25, which are described using FIG. 5 in the First Example. Each of the sections above has the substantially similar function. Thus, the description is omitted.

The data storing section 65 stores and records the read data. Even when the read data is sent to the server terminal 60 in a divided state, the read data is restored to the pre-divided state in the data restoring section 64 before being stored in the data storing section 65. Thus, the divided data is stored similarly to the undivided read data sent from the server terminal 60. These are the descriptions of each of the process functions configuring the server terminal 60.

Figure 11:
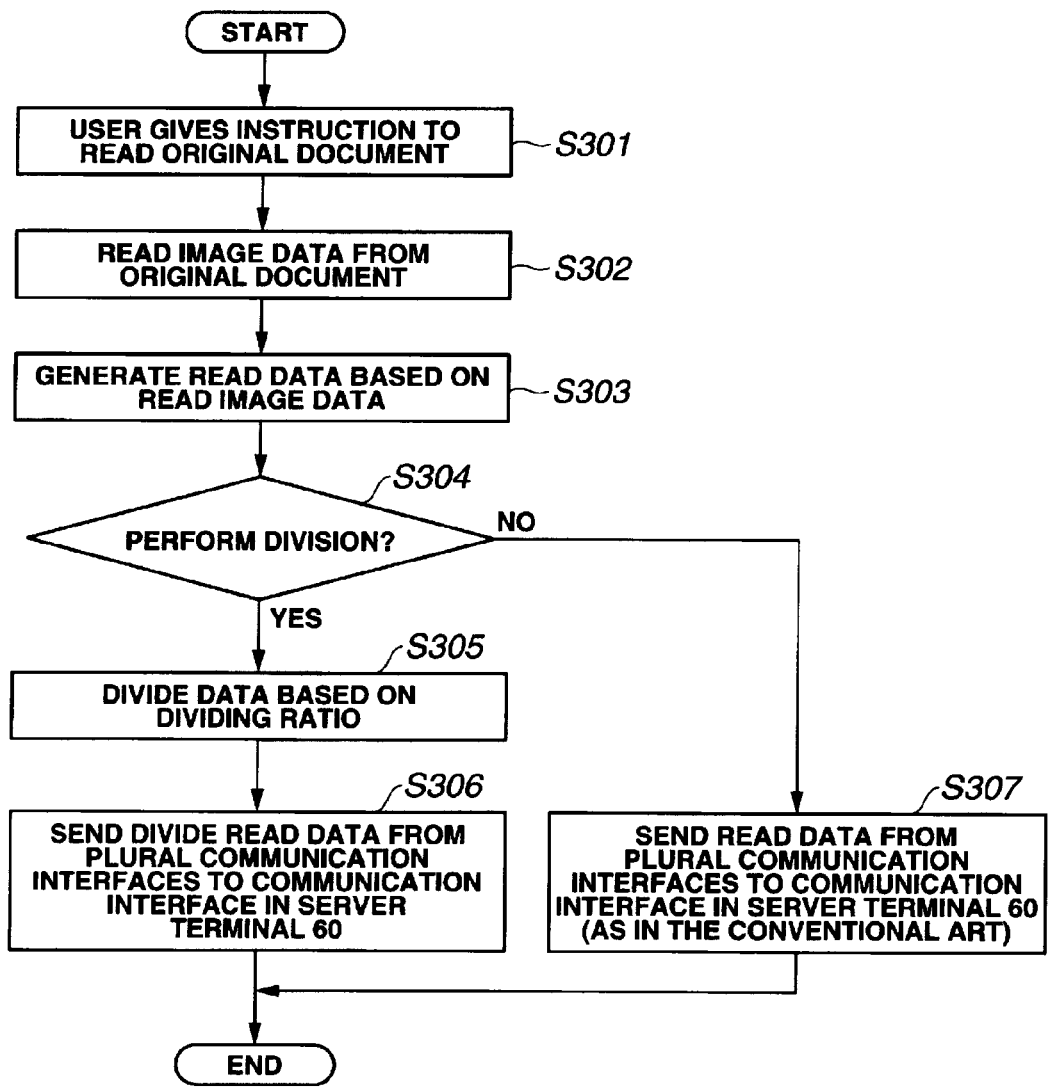
FIG. 11 is a diagram showing operation at the time of scanning a original sheet by the scanner 50 shown in FIG. 8.
Figure 12:
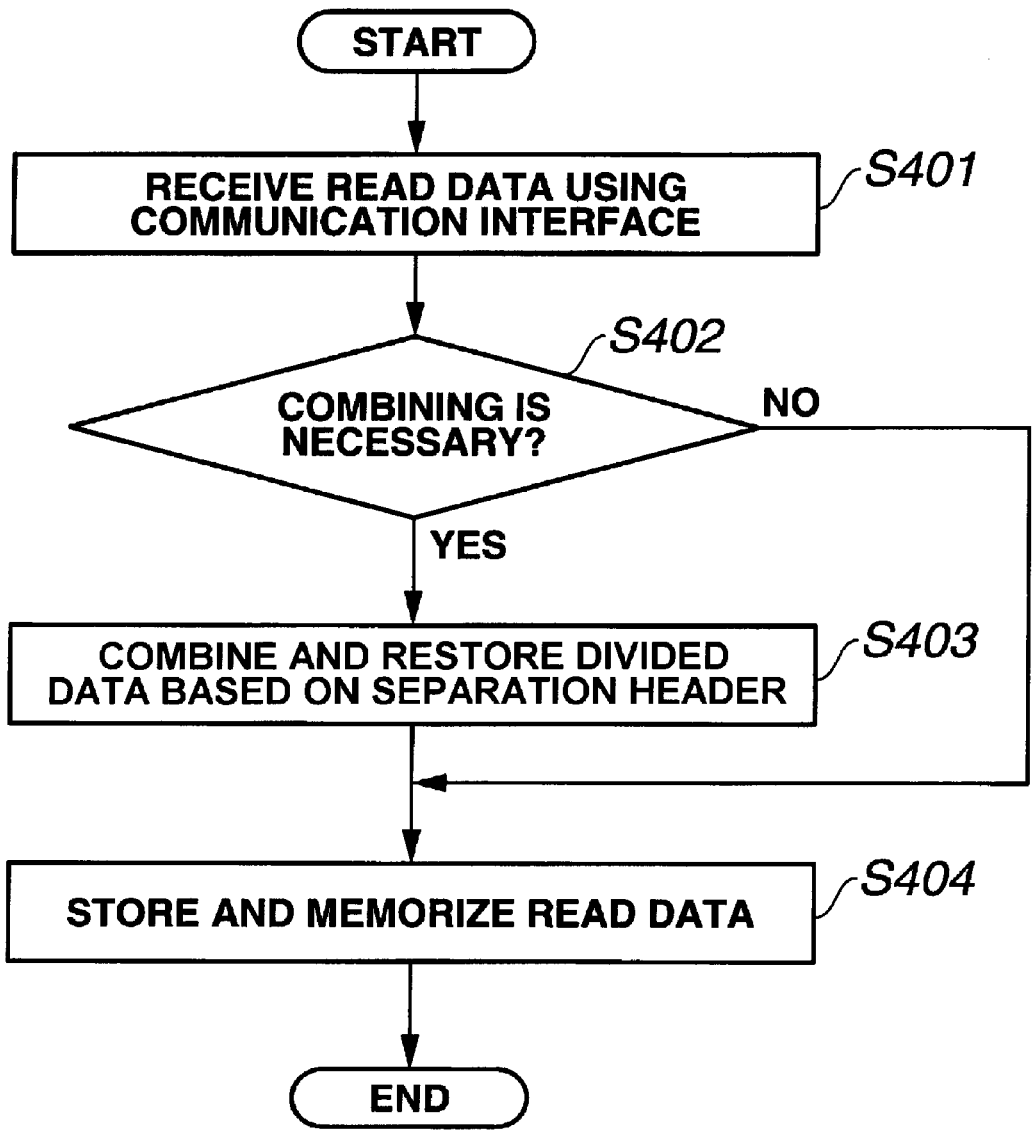
FIG. 12 is a diagram showing operation at the time of storing and recording scanned data by the server terminal 60 shown in FIG. 8.

Here, with reference to FIGS. 11 and 12, the scanning process in the information communication system as shown in FIG. 8 will be described. It should be noted that FIGS. 11 and 12 provide, as flow charts, the process in the scanner 50, and that in the server terminal 60, respectively.

Firstly, with reference to FIG. 11, the process when the original document is scanned in the scanner 50 will be described.

When the user gives an instruction to read the original documents with the scanner 50 (step S301), image data is read from the original document with the reading section 53, and the read image data is sent to the read data generating section 54 (step S302). Then, the read data generating section 54 performs the image process to the sent image data to generate the read data (step S303).

After the read data is generated, the scanner firstly judges whether the generated read data is to be divided. More specifically, it is judged, by the division necessity judging section 55, whether the size of the sent read data is less than the size of the minimum division applicable size.

As a result, when it is judges that the read data is not to be divided because the size of the read data is less than the size of the minimum division applicable size (no in step S304), the read data is sent, by the data sending section 58, to the wired LAN interface 61 in the server terminal 60 using any of the communication interfaces (step S307). When it is judged that the read data is to be divided because the size of the read data is the minimum division applicable size or over (yes in step S304), the read data is divided, by the data dividing section 57, based on the dividing ratio maintained in the division information maintaining section 56 (step S305). In other words, the read data is divided into the data to be sent using the wired LAN interface 51 and the data to be sent using the wireless LAN interface 52. Then, each of the divided data is separated into the data appropriate for sending, and separation header is attached to each of the separated divided data. Consequently, the read data is divided into the groups of the separated divided data for both of the communication interfaces.

In the data sending section 58, those groups of the separated divided data are sent to the address 3 respectively using the wired LAN interface 51 and the wireless LAN interface 52 (step S306). Then, the process ends.

Next, with reference to FIG. 12, a process for storing and recording the read data in the server terminal 60 will be described.

When the read data is sent to the server terminal 60, the data sending section 62 in the server terminal 60 receives the data via the wired LAN interface 61 (step S401). After completing the receipt of the read data, the server terminal 60 firstly judges whether the received read data requires the restoration process. In other words, it is judged, by the restoration necessity judging section 63, whether the received read data includes the separation header.

As a result, when it is judged that the restoration process is not required because the data does not include the separation header (no in step S402), the read data is directly stored in the data storing section 65 (step S404). On the other hand, when it is judged that the restoration process is necessary because of the inclusion of the separation header (yes in step S402), the read data is restored to the pre-divided state in the data restoring section 64 (step S403). More specifically, the read data is restored by combining the received data sent via the wired LAN 31 and the wireless LAN 32 based on the separation headers in the read data received via the wired LAN interface 61.

After the read data is restored to the pre-divided state through the restoration process by the data restoring section 64, the restored data is stored in the data storing section 65 (step S404), and then the process ends.

It should be noted that, in the above Example, the description has been made using a case, for example, where the minimum division applicable size is set, it is judged whether the read data is to be divided, and the data is not divided when the size of the data is less than the minimum division applicable size. However, it is understood that this judgment is not always necessary, and the present invention may be configured to divide all the sent data.

THIRD EXAMPLE

Next, a description will be made of the Third Example, which provides a method for setting the dividing ratio. There are three types of methods for setting the dividing ratio: (1) a manual setting by a user; (2) an automatic setting based on the communication speed; and (3) an automatic setting dynamically changed in accordance with the traffic.

Figure 13:
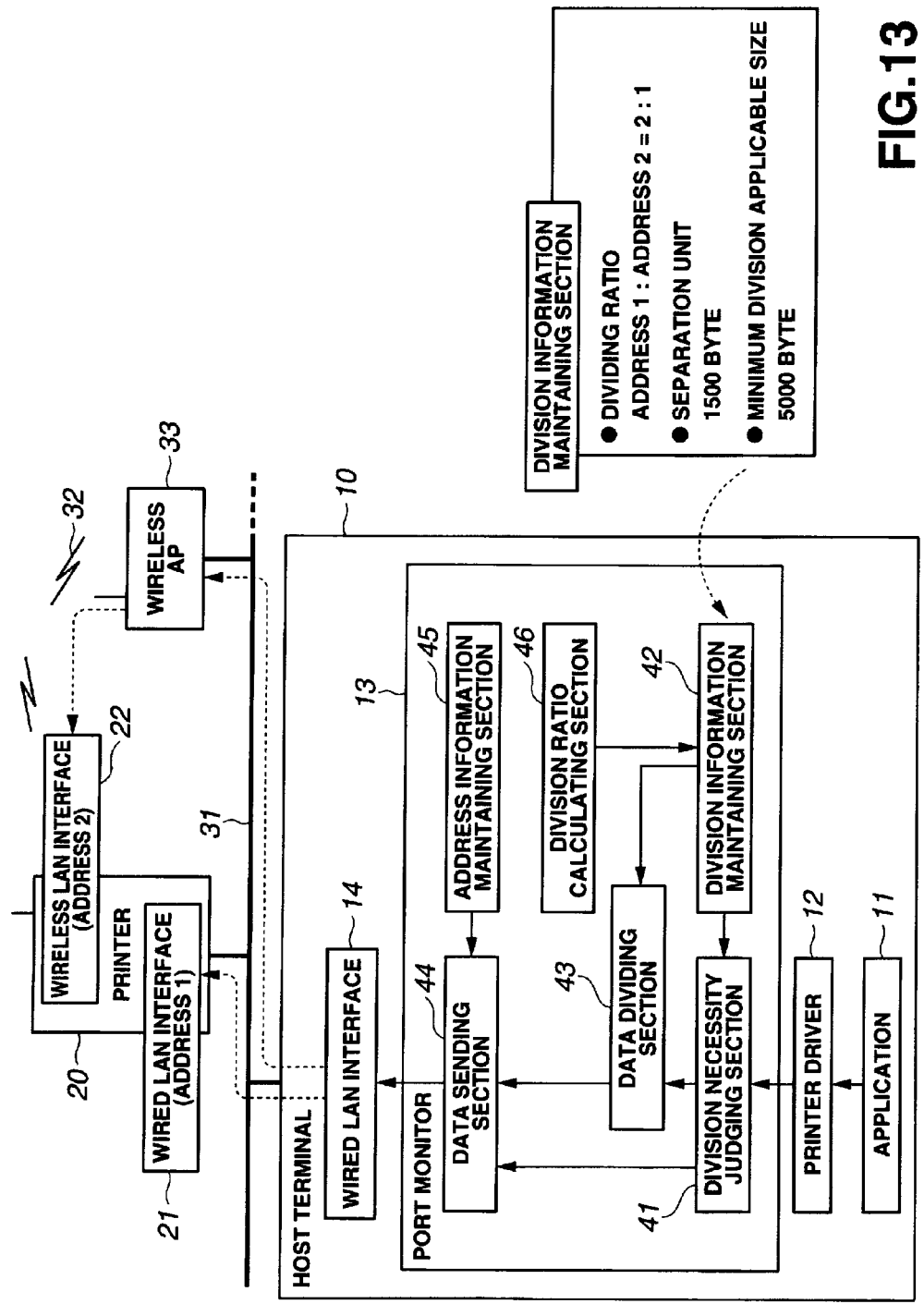
FIG. 13 is a diagram showing a part of a configuration of functions of the host terminal 10 pertaining to a third example.

Here, in the manual setting by the user (1), the dividing ratio is set based on user's input operation. On the other hand, in the case of the automatic setting based on the communication speed (2) and the automatic setting dynamically changed in accordance with the traffic (3), the dividing ratio is automatically calculated by the sending device. Thus, as shown in FIG. 13, a division ratio calculating section 46 having a function of calculating the dividing ratio is further included in the sending device pertaining to the Third Example. It should be noted that FIG. 13 provides a configuration in which the division ratio calculating section 46 is further included in the host terminal 10 as described in FIG. 2 in the First Example. However, if the division ratio calculating section 46 is provided to the scanner 50 as described in FIG. 9 in the Second Example, the automatic calculation of the dividing ratio is also possible.

Here, examples for calculating process of the dividing ratio in the division ratio calculating section 46 will be described.

In the case of the automatic setting based on the communication speed (2), for example, the dividing ratio can be calculated based on: (2-A) a ratio of the standard speed of the interfaces; or (2-B) a ratio of response time from the receiving device. When the dividing ratio is calculated based on the ratio of the standard speed of the interface (2-A), the standard speed of the communication interface is used. For example, as shown in FIG. 14A, when the standard speed of the wired LAN interface is 100 Mbps and the standard speed of the wireless LAN interface is 54 Mbps, the ratio of the standard speed between both of the communication interfaces is 100:54. Then, the dividing ratio of approximately 2:1 is calculated. It should be noted that the standard speed of the communication interface may be obtained, for example, through the value of ifspeed in the MIB information acquired by using the SNMP protocol.

Additionally, when the dividing ratio is calculated based on the ratio of response time from the receiving device (2-B), an inquiry is made to the receiving device by, for example, making each of the communication interfaces issue the ping command, and the response time from the inquiry is measured. Then, the dividing ratio is obtained from the response time. For example, as shown in FIG. 14B, when the response time through the wired LAN interface is 0.3 sec and that through the wireless LAN interface is 0.7 sec, the dividing ratio is obtained by the reciprocal number of each of the response time, namely, approximately 2:1.

In the case of the automatic setting based on the communication speed (2), various methods for calculating the dividing ratio, other than the above-described method, are available. For example, since the communication speed is changed in accordance with the number of hops on the communication path (for example, the number of rooters), the dividing ratio may be calculated based on the number of the hops. And, since the communication speed is changed in accordance with the presence or absence of the security setting, such as IPsec (Security Architecture for Internet Protocol), the dividing ratio is calculated based on the presence or absence of the security setting. It should be noted that the dividing ratio may be calculated by combining the above-described methods.

Figure 15:
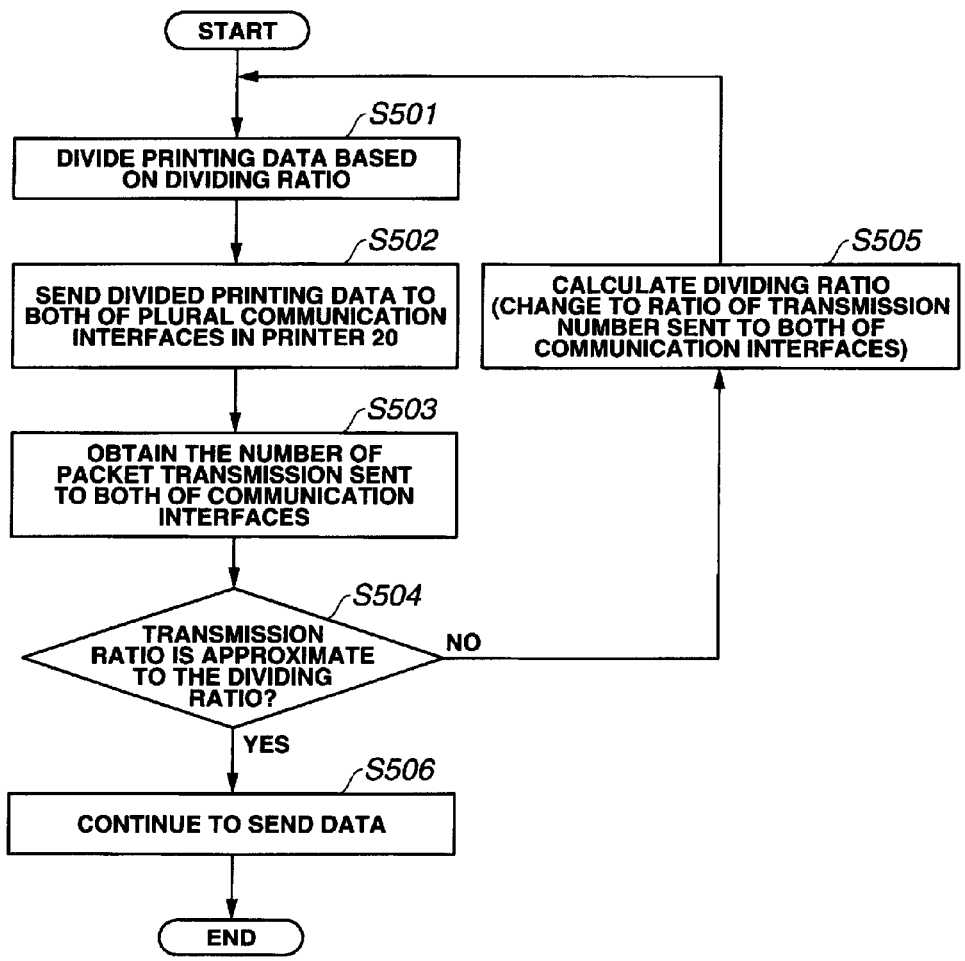
FIG. 15 is a flowchart showing operation at the time when the dividing ratio is calculated based on the traffic in the host terminal 10 shown in FIG. 13.

Additionally, in the case of the automatic setting dynamically changed in accordance with the traffic (3), the dividing ratio is calculated in accordance with the change in the network traffic. Here, with reference to FIG. 15, a method for calculating the dividing ratio based on the number of packet transmission (packet transmission ratio) of each of the communication interfaces will be described as an example method for calculating the dividing ratio in accordance with the traffic. FIG. 15 shows a process of calculating the dividing ratio in the host terminal 10 as shown in FIG. 13. It should be noted that, since a process during the period from the time when the user gives a printing instruction to the time when the printing data is converted in the printer driver 12 is similar to that in FIG. 6 in the First Example, the description on this process is omitted, and only a process after the data is divided will be described.

Upon sending the printing data generated in the printer driver 12 to the port monitor 13, the data dividing section 43 divides the printing data based on the dividing ratio maintained in the division information maintaining section 42 (step S501). In other words, after the printing data is divided into the data to be sent to the wired LAN interface 21 and the data to be sent to the wireless LAN interface 22, each of the divided data is separated into the data appropriate for sending. Then, the separation header is attached to each of the separated divided data. Consequently, the printing data is divided into the group of the separated divided data to be sent to the wired LAN interface 21 and the group of the separated divided data to be sent to the wireless LAN interface 22, as shown in FIG. 3.

The data sending section 44 sends the groups of the separated divided data to each of the address 1 (wired LAN interface 21) and the address 2 (wireless LAN interface 22) (step S502). After the initiation of sending the data, the number of packet transmission sent to both of the communication interfaces is separately obtained by the division ratio calculating section 46 (step S503), and it is judged whether the ratio of the obtained number of packet transmission sent to both of the communication interfaces is approximate to the dividing ratio. For example, if the number of packet transmission sent to the wired LAN interface 21 is 30 packets and that sent to wireless LAN interface 22 is 10 packets, the transmission ratio is 3:1. It should be noted that, in this description, the allowable limit to some extent is predetermined, and if a value is within the allowable limit, it is judged as the approximate value.

As a result, when the ratio of packet transmission sent to both of the communication interfaces is approximate to the dividing ratio (step S504), the data sending section 44 continues to send the data (step S506). When the difference between the dividing ratio and the ratio of packet transmission sent to both of the communication interfaces exceeds the allowable limit (step S504), the division ratio calculating section 46 calculates the transmission ratio based on the number of packet transmission sent to both of the communication interfaces, and this calculated ratio is set to the division information maintaining section 42 as a new dividing ratio (step S505). Then, the process in the host terminal 10 returns back to the step S501, and the dividing process is performed by the data dividing section 43.

These are exemplary embodiments of the present invention. However, the present invention is not limited to the examples as described above or shown in figures, but also may be modified within the scope and spirit of the claimed invention in examples.

For example, in the dividing method as described in the above examples 1-3, the data size per separated divided data is changed in accordance with the dividing ratio. However, the number of the separated divided data may be changed in accordance with the dividing ratio by fixing the size of the separated divided data. Specifically, when the size of the printing data, the dividing ratio and the separation unit is set to 9000 byte, 2:1 and 1500 byte, respectively, the size of the separated divided data is fixed to 1500 byte, which is set to the separation unite. Then, the group of the separated divided data corresponding to the dividing ratio of "2" comprises four sets of the separated divided data (1500 byte×4 sets), while the group of the separated divided data corresponding to the dividing ratio of "1" comprises one set of the separated divided data (1500 byte×1 set).

Furthermore, in the above-described examples 1-3, in the data communication through the wired LAN using the wired LAN interface and through the wireless LAN using the wireless LAN interface, the present invention is described using an example case where the data is sent through both of the communication by dividing the data. However, the present invention is not limited to this case, but is also applicable to communications using USB (Universal Serial Bus), IEEE 1394 (the Institute of Electrical and Electronics Engineers 1394) or other interfaces. It should be noted that the communication sections is not limited to the wired and the wireless, and, for example, the communication may be performed only between wired communications.

Furthermore, in the above-described examples 1-3, the present invention is described using an example case where the data is sent using two communication sections (wired LAN and wireless LAN) after being divided. However, the present invention is not limited to this case. Even when more than three communication sections are used, the process similar to the above-described examples can be performed.

Furthermore, the process in the sending device and the receiving device described in the above-described examples 1-3 may be implemented by a transmission control program and a reception control program installed in a computer. It should be noted that these transmission control program and reception control device may be provided not only by the network or other communication sections, but also by storing in a CD-ROM or other recording medium.

The information communication system, the sending device, the receiving device, the sending program and the receiving program of the present invention can be applicable to the whole of the information communication system comprising the sending device and the receiving device, the sending device, the receiving device, the transmission control program causing the computer to execute processes in the sending device, and the reception control program causing the computer to execute processes in the receiving device.

The foregoing description of the exemplary embodiment of the present invention is provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information communication system including: a sending device that sends electronic information via a communication section; a receiving device that receives the electronic information sent from the sending device via the communication section, the sending device comprising:
a ratio information maintaining section that maintains ratio information regarding an amount of electronic information assigned to each of a plurality of communication sections at the time of sending the electronic information;

a dividing section that divides the electronic information corresponding to the plurality of communication sections on the basis of the ratio information maintained by the ratio information maintaining section; and a sending section that sends the electronic information divided by the dividing section to the receiving device, the receiving device comprising:

a receiving section that receives the electronic information sent from the sending section via the plurality of communication sections; and a restoring section that combines and restores the electronic information received by the receiving section to a state prior to being divided by the dividing section.

2. The information communication system according to claim 1, wherein the sending device further comprises a judging section that judges whether the electronic information is to be divided by the dividing section, and the dividing section divides the electronic information based on the judgment result by the judging section.

3. The information communication system according to claim 1, wherein the sending device further comprises a ratio information calculating section that calculates the ratio information, and the ratio information maintaining section maintains the ratio information calculated by the ratio information calculating section.

4. The information communication system according to claim 3, wherein the ratio information calculation section calculates the ration information based on an electronic information communication speed of each of the plurality of communication sections.

5. The information communication system according to claim 3, wherein the ration information calculation section calculates the ration information based on an amount of usage of each of the plurality of communication sections.

* * * * *